US008815004B2

(12) United States Patent
Moffett et al.

(10) Patent No.: US 8,815,004 B2
(45) Date of Patent: Aug. 26, 2014

(54) TAILINGS STREAM TREATMENT PROCESSES

(75) Inventors: Robert Harvey Moffett, Landenberg, PA (US); Peter Andrin, Napanee (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 192 days.

(21) Appl. No.: 13/329,375

(22) Filed: Dec. 19, 2011

(65) Prior Publication Data

US 2012/0318170 A1 Dec. 20, 2012

Related U.S. Application Data

(60) Provisional application No. 61/425,315, filed on Dec. 21, 2010.

(51) Int. Cl.
| | | |
|---|---|---|
| *C08L 91/00* | (2006.01) | |
| *C08L 91/06* | (2006.01) | |
| *C08J 3/02* | (2006.01) | |
| *C08L 95/00* | (2006.01) | |
| *C09D 4/00* | (2006.01) | |
| *C09D 101/00* | (2006.01) | |
| *C09D 201/00* | (2006.01) | |
| *C04B 26/00* | (2006.01) | |
| *C04B 26/20* | (2006.01) | |
| *C04B 26/24* | (2006.01) | |
| *C04B 26/16* | (2006.01) | |
| *C04B 26/06* | (2006.01) | |
| *C04B 26/18* | (2006.01) | |
| *C04B 26/02* | (2006.01) | |
| *C04B 28/24* | (2006.01) | |
| *C04B 26/10* | (2006.01) | |
| *C04B 26/30* | (2006.01) | |
| *C04B 26/14* | (2006.01) | |
| *C04B 111/00* | (2006.01) | |

(52) U.S. Cl.
CPC ............. *C04B 28/24* (2013.01); *C04B 26/003* (2013.01); *C04B 26/20* (2013.01); *C04B 26/24* (2013.01); *C04B 26/16* (2013.01); *C04B 26/06* (2013.01); *C04B 26/18* (2013.01); *C04B 2111/0075* (2013.01); *C04B 26/02* (2013.01); *C04B 26/105* (2013.01); *C04B 26/30* (2013.01); *C04B 26/14* (2013.01)
USPC ........ 106/270; 106/269; 106/271; 106/273.1; 106/277

(58) Field of Classification Search
USPC ....................... 106/270, 269, 271, 273.1, 277
See application file for complete search history.

(56) References Cited

U.S. PATENT DOCUMENTS

| | | | | | |
|---|---|---|---|---|---|
| 3,837,872 | A | * | 9/1974 | Conner ......................... | 588/252 |
| 3,841,776 | A | * | 10/1974 | Klaus .............................. | 404/41 |
| 4,094,768 | A | * | 6/1978 | Fuller ........................... | 208/391 |
| 4,125,340 | A | * | 11/1978 | Klaus et al. ..................... | 404/35 |
| 4,229,295 | A | * | 10/1980 | Krofchak ...................... | 210/723 |
| 4,554,695 | A | * | 11/1985 | Rowland ........................ | 14/69.5 |
| 2009/0301937 | A1 | * | 12/2009 | Duyvesteyn et al. ......... | 208/390 |
| 2010/0101981 | A1 | * | 4/2010 | Moffett et al. ................ | 208/391 |
| 2010/0104744 | A1 | * | 4/2010 | Moffett ......................... | 427/138 |
| 2010/0126910 | A1 | | 5/2010 | Moffett et al. | |
| 2010/0147516 | A1 | | 6/2010 | Betzer-Zilevitch | |

FOREIGN PATENT DOCUMENTS

| | | |
|---|---|---|
| EP | 2055685 A1 | 5/2009 |
| WO | 2009102565 A1 | 8/2009 |
| WO | 2010056539 A1 | 5/2010 |

OTHER PUBLICATIONS

Hinshaw, et al. "Assessing the mechanical behavior of cemented clay tailings". Tailings and Mine Waste '04', Taylor and Francis, 2004,. pp. 109-116, ISBN: 978-0-20-302163-7.
BGC Engineerings Inc, "Oil Sands Tailings Technology Review", http://hdl.handle.net/10402/era.17555, Apr. 4, 2012, pp. 30-39.
Mikula, et al., "Nature and Fate of Oil Sands Fine Tailings," in Advances in Chemistry, 1996, vol. 251, pp. 677-723.
"Part B Report : A Screening Study of Oil Sands Tailings Technologies and Practices" prepared for Alberta Energy Research Institute by D. W. Devenny, Mar. 2010, available at http://eipa.alberta.ca/media/40994/report%20b%20%20inte-grated%20oil%20sands%20tailings%20treatment%20tech-nologies%20march%202010.pdf (accessed Dec. 15, 2011).
Mikula, et al., "Centrifugation Options for Production of Dry Stackable Tailings in Surface-Mined Oil Sands Tailing Management," J. Canadian Petroleum Technology, (2009), vol. 48, No. 9, pp. 19-23 (Abstract Only).
Masliyah, et al., "Understanding Water-Based Bitumen Extraction from Athabasca Oil Sands," Can. J. Chem. Engg. (2004) vol. 82, pp. 628-654.
US Army Corps of Engineers Grouting Manual EM 1110-1-3500, Jan. 31, 1995.
International Search Report, PCT/US2011/066462, Aug. 5, 2012.

* cited by examiner

*Primary Examiner* — James McDonough

(57) ABSTRACT

A process for treating a tailings stream comprises (a) contacting (1) a gelling agent and (2) an activator with said tailings stream to produce a gel; (b) entrapping solids including sand and clay, and other solid particles with the gel; and (c) allowing the gel to strengthen and solidify to produce a trafficable deposit; wherein the tailings stream comprises water and solids, which solids comprise sand, clay and other solids particles, and wherein 5% by volume to 100% by volume of the solids have a particle size less than 0.05 mm, based on the total volume of the solids. The process may further comprises spreading the gel produced in step (a) or the trafficable deposit produced in step (c) over a surface. The present invention is particularly useful to treat tailings streams produced in processes to extract bitumen from oil sands ores.

26 Claims, No Drawings

TAILINGS STREAM TREATMENT PROCESSES

FIELD OF THE INVENTION

The present invention relates to a process to treat tailings streams produced in mining operations to provide a solid product capable of providing a trafficable surface.

BACKGROUND OF THE INVENTION

Oil sands have become an attractive source of oil recovery to support global demand for oil. Oil sands are large deposits of naturally occurring mixtures of bitumen, water, sand, clays, and other inorganic materials found on the earth's surface. Bitumen is a highly viscous form of crude oil. The largest oil sands deposits are found in Canada and Venezuela. In particular, the Athabasca oil sands deposit is equivalent to 1.6 to 2.7 trillion barrels of oil, and is located in the Canadian provinces of Alberta and Saskatchewan. About 10% to 15% of the economically recoverable Athabasca oil sands deposits can be surface mined. Once the oil sands ore is mined, it is processed to extract the bitumen.

The bitumen must be extracted from the oil sands ore by separating the bitumen from the water, sand and fine clays contained in the oil sands ore. Today, the oil sands ore is prepared and conditioned prior to extracting bitumen. Processes which include open pit mining, crushing the ore, mixing the crushed ore with warm process water and optionally chemicals, and allowing the ore slurry to be conditioned over time with mechanical agitation or through shear experienced in fluid flow. Ore slurry conditioning is accomplished today by pumping the ore slurry through a hydrotransport line to a centralized extraction plant.

The oil sands ore may be mixed with chemicals and water at the front end of the process (preparing and conditioning steps as recited above) and/or added at one of more of the downstream unit operations steps to aid extraction. The oil sands ore is prepared and conditioned to provide the ore in the form of an aqueous slurry. The slurry undergoes extraction in an extraction plant, which comprises several unit operations.

Various tailings streams are produced in a bitumen extraction process. A tailings stream is an aqueous stream (slurry, suspension) containing components requiring further treatment, including for extracting valuable bitumen or for solids removal and/or purification to enable recycle of the water content of the tailings stream. Ultimately, some tailings streams will be deposited in a tailings pond for long periods of time. Coarse solids comprising predominantly sand settle quickly at the bottom of the tailings ponds. The top layer of the pond is clarified with time and gravity to make water that is suitable for re-use in the extraction process. A large middle layer is present that is comprised of water and fine solids which solids settle very slowly. The middle layer ultimately becomes mature fine tailings (MFT).

MFT is a stable composite slurry comprising fine clays and sands, silt, water, and bitumen. MFT has little strength, no vegetative potential and may be toxic to animal life, so it must be confined and prevented from contaminating water supplies. Typically, several years of settling time are required to make MFT.

Thickened tailings, with similar physical properties to MFT, can be produced through chemical thickening. Chemical thickening enables faster recovery of the water and reduces heat energy requirements when this warm water is recycled for use back in the extraction process.

MFT ponds pose an environmental concern. The Energy Resources Conservation Board of Alberta (ERCB) has issued Directive 074, which mandates a reduction of fine tailings ponds and the formation of trafficable deposits for all oil sands operators. MFT then becomes stable with little additional settling or consolidation occurring for decades.

Significant new regulations have been introduced that are forcing operators to develop and change their tailings management processes. Tailings management processes under evaluation and/or development include bioremediation through water capping of tailings ponds (i.e. end pit lakes), composite tailings (MFT plus sand and often a coagulant), non-segregating tailings (thickened tailings plus sand and often a coagulant), dry stackable tailings, paste technology, centrifugation, rim ditching, and several others. Tailings streams that can be generated in oil sands mining operations are known to those skilled in the art. See for example, R. J. Mikula, et al., "Nature and Fate of Oil Sands Fine Tailings," in Advances in Chemistry, 1996, vol. 251, pp. 677-723; and "Part B Report: A Screening Study of Oil Sands Tailings Technologies and Practices" prepared for Alberta Energy Research Institute by D. W. Devenny, March 2010, available at http://eipa.alberta.ca/media/40994/report%20b%20%20integrated%20oil%20sands%20tailings%20treatment%20technologies%20march%202010.pdf (accessed Dec. 15, 2011). It will be appreciated by those skilled in the art that reference names (terminology) of the tailings streams may vary as oil sands producers vary and processes used to extract oil and address the various tailings streams will also vary.

MFT or fine thickened tailings may be treated with sand and a coagulant such as gypsum and/or carbon dioxide, and optionally lime, to produce consolidated composite tailings (CCT). CCT may be referred to as composite tailings (CT) and non-segregating tailings (NST). Such process is not ideal for several reasons. CCT takes many years to consolidate and strengthen to reach the compressive strength requirements dictated by Directive 074, which sets forth the regulatory requirements. It has been disclosed that CCT may take at least 10 years to consolidate and strengthen to meet the regulatory requirement. CCT dramatically increases the volume of treated fine tailings as compared to the starting MFT or thickened tailings stream. As a result, extra land surface and more containment dykes need to be built to contain the extra treated tailings volume. CCT requires sand to build the dykes and to maintain the correct sand to fines ratio needed in the recipe. Sand shortages and land shortages in mining operations may limit the application of CCT.

Tight control of the sand to fine ratio is required in CCT processes to maintain a non-segregating mixture. If the correct sand to fine ratio is not maintained, the mixture segregates and will never consolidate. Treated material that segregates will need to be re-worked to comply with the regulatory requirement and extra land and time is needed to store off-spec (outside of specifications) CCT.

The NST process using thickened tailings and coarse solids captured directly from the extraction process may produce >40% off-spec NST, that is material that does in fact segregate. Sand and tailings that are needed to make the CCT are supplied from an upstream extraction process. The ratio of sand and fine solids available in real-time from the process will vary depending on the composition of the oil sands ore. In many circumstances, the sand to fine solids ratio needed to make a non-segregating mixture cannot be provided in real-time from the process. Thus, the interaction between extraction and CCT treatment may affect either or both of the upstream extraction process and the downstream tailings treatment process. Finally, gypsum/lime treatment adds calcium ions to the recovered water, which are problematic when this recovered water is re-used in the extraction process.

An alternative process employing centrifuges in conjunction with conventional polymeric flocculants to treat MFT to produce a dewatered MFT stream and recovered water is being evaluated. Centrifuging requires large capital investment in the centrifuge equipment. Also, the centrifuge product cannot be transported through pipeline and must be transported by truck or rail to dedicated disposal areas. R. J. Mikula, et al., "Centrifugation Options for Production of Dry Stackable Tailings in Surface-Mined Oil Sands Tailing Management," J. Canadian Petroleum Technology, (2009), vol. 48, No. 9, pp. 19-23.

Another challenge for oil sands producers is separation of bitumen from sand and clay fines, as well as dewatering of the sand and clay fines for disposal, for so-called "poor quality ores." Generally, a poor quality ore, in reference to an oil sands ore, is an ore that contains a lower than average bitumen content, a higher than average fine solids content, or both. Also, ores that contain different types and amounts of natural surfactants than average can be poor quality ores. Ores that have higher ionic strength in their connate water than average can be poor quality ores. Poor quality ores may also be characterized as ores that have undergone a high degree of oxidation. Finally, ores that contain a higher than average percentage of montmorillonite or other fine clays, or a higher proportion of ultra-fine solids less than 2 microns as compared to the total fine solids fraction (<44 microns) can be poor quality ores. The high clay and fine solid content in ores not only hinder the extraction of bitumen, but also the dewatering process of sand and clay fines in downstream tailings operations. Poor quality ores are difficult to extract bitumen from at acceptable yields using conventional methods. In addition, more bitumen is retained in the tailings streams from extraction of poor quality ores, which is sent to the tailings pond as a yield loss. Seem for example, J. Masliyah, et al., "Understanding Water-Based Bitumen Extraction from Athabasca Oil Sands," Can. J. Chem. Engg. (2004) vol. 82, pp. 628-654.

Poor quality ores can reduce bitumen recovery by 40% or more and are avoided when possible. However, oil sand producers are obligated to process all ores containing 7 wt % bitumen or more with minimum bitumen recovery rates stipulated in the ERCB regulation ID 2001-7. An alternative is to blend poor quality ores with good quality ores so they can be processed more effectively. Another alternative is to apply chemical processing aids, such as sodium hydroxide, with these poor processing ores to improve bitumen recovery. With demand for oil increasing every year, there is a need to mine these poor quality ores and to produce higher yields of bitumen. Tailings streams from these ores should be essentially free of bitumen and separated from water, so the water can be re-used and the solids can be returned to the environment free of bitumen, within environmental limits.

Some producers do not have an economical source of low temperature heat that can be used to raise the temperature of process water. In these instances, there is a strong need to reduce the extraction temperature (for example, less than about 55° C.) to save heat energy and associated greenhouse gas emissions. For example, when an adjacent upgrading facility proximate to the mining operation is not available, there is added cost to supply heat energy for the extraction water. However, higher temperatures increase the efficiency of the extraction process and the recovery yield of the oil. Technology improvement is needed to improve the recovery yield at lower extraction temperatures.

U.S. Patent Publication No. 2010/0101981-A1 discloses a process to extract bitumen from an oil sands ore comprising contacting an aqueous slurry of an oil sands ore with a polysilicate microgel. U.S. Patent Publication No. 2010/0126910-A1 discloses a process to treat a tailings stream comprising contacting a tailings stream with a polysilicate microgel, anionic polyacrylamide, and (i) a multivalent metal compound or (ii) a low molecular weight cationic organic polymer. U.S. Patent Publication No. 2010/0104744-A1 discloses a process to treat a tailings stream comprising contacting a tailings stream with a silicate source, which is a polysilicate microgel or an alkali metal silicate, and an activator, which causes gelation of the silicate source with the tailings stream.

While there have been many advances in the treatment of tailings, there remains a need to improve de-watering (less water in the tailings), consolidation (reduction of volume of the tailings), and strengthening of the tailings and to reduce the need to add fresh water to bitumen recovery processes. There is also a need to reduce or eliminate tailings ponds, including MFT ponds, where the remaining solid can be useful and the water can be recovered and re-used in the process. There is also a need to return the mined area close to its original condition. The present invention meets these needs.

SUMMARY OF THE INVENTION

The present invention provides a process for treating a tailings stream wherein the tailings stream comprises water and solids, which solids comprise sand and clay, and wherein 5% by volume to 100% by volume of the solids have a particle size less than 0.05 mm, based on the total volume of the solids, the process comprising (a) contacting (1) a gelling agent and (2) an activator with said tailings stream; (b) entrapping the solids within a gel produced from said gelling agent; and (c) allowing the gel to strengthen and solidify, to produce a trafficable deposit. The gelling agent is selected from the group consisting of colloidal silica, aluminum-modified colloidal silica, de-ionized colloidal silica, polysiloxane, siliconate, acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof. Optionally, the tailings stream further comprises dissolved chemical species and hydrocarbons. Preferably, the solids comprise 10% to 100% by volume of particles having a particle size of less than 0.05 mm, more preferably, 20% by volume to 100% by volume of the solids have a particle size less than 0.05 mm, based on the total volume of the solids. In the step of allowing the gel to strengthen and solidify, the gel may be dewatered and/or dried.

Optionally, the process further comprises adding an accelerator in the contacting step (a). Optionally, the process further comprises adding a reinforcing agent in the contacting step (a). Optionally, the process further comprises spreading the gel produced in step (b) or the trafficable deposit produced in step (c) over a surface, The tailings stream is preferably an aqueous stream produced after extraction or removal of a valuable mineral from a mining operation process stream. The present invention is particularly useful to treat tailings streams produced in processes to extract bitumen from oil sands ores.

In a second embodiment a trafficable deposit is produced from the treatment process. The trafficable deposit comprises the product of the treatment process, optionally comprising adding a reinforcing agent in the contacting step (a). The trafficable deposit has a minimum undrained shear strength of 5 kPa one year after deposition, and a minimum undrained shear strength of 10 kPa five years after deposition.

DETAILED DESCRIPTION OF THE INVENTION

The present invention is a process to treat a tailings streams comprising (a) contacting (1) a gelling agent and (2) an activator with said tailings stream to produce a gel matrix comprising entrapped solids, and (b) allowing the gel matrix to strengthen and solidify, e.g., to dewater and/or dry, to produce a trafficable deposit. The gelling agent is selected from the group consisting of colloidal silica, aluminum-modified colloidal silica, de-ionized colloidal silica, polysiloxane, siliconate, acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof. The tailings stream comprises water and solids. The solids comprise sand and clay, wherein 5% by volume to 100% by volume of the solids have a particle size less than 0.05 mm, based on the total volume of the solids. Preferably, the solids comprise 10% to 100% by volume of particles having a particle size of less than 0.05 mm, more preferably, 20% by volume to 100% by volume of the solids have a particle size less than 0.05 mm, based on the total volume of the solids.

Optionally, the process further comprises adding an accelerator in the contacting step (a). Optionally the process further comprises adding a reinforcing agent in the contacting step (a). Optionally, the process further comprises spreading the gel produced in step (b) or the trafficable deposit produced in step (c) over a surface. Preferably, the surface is sloped or in a dewatering pit.

In a second embodiment a trafficable deposit is produced from the treatment process. The trafficable deposit comprises the product of the treatment process, optionally comprising adding a reinforcing agent in the contacting step (a). The trafficable deposit has a minimum undrained shear strength of 5 kPa one year after deposition, and a minimum undrained shear strength of 10 kPa five years after deposition.

Tailings Streams

The present invention is useful for treating tailings streams. A tailings stream is defined herein as an aqueous stream (slurry, suspension) containing components requiring further treatment. A tailings stream is typically an aqueous stream comprising water, clay and sand, produced after extraction or removal of a component from a process stream derived from mining operations.

The tailings stream may comprise valuable mineral content (bitumen, coal, metal) or solids to be removed, for example for purification of the tailings stream, e.g., to enable recycle of the water content of the tailings stream back to the industrial process. The component can be a valuable mineral (bitumen, coal, metal, metal oxide) or a waste component. Essentially any mining operation that uses water to convey or wash materials will generate a tailings stream.

Alternatively, the component is removed from an industrial process stream that uses water, such as milling, refining, smelting, and other manufacturing processes. Tailings streams in milling or refining operations generally comprise water, fine particles of clay, silt and sand, as well as other unwanted components, such as residual metals and other organic and inorganic materials that are finely dispersed and that are not easily separated from the water. Refining processes include, but are not limited to, extraction of oil, nickel and copper.

Examples of mining operations where the present invention is useful for treating tailings streams include, but is not limited to, coal, uranium, potash, phosphate, gypsum, zinc, gold, silver, lead, molybdenum, lithium, titanium, zirconium, and cobalt. Other mining operations will be appreciated by those skilled in the art. Such mining operations can be, for example, for mining of bitumen, coal, clay, gold, or copper.

The tailings stream may also be from fresh tailings produced from a bitumen recovery process, a tailings pond, refinery process waters, ore mining process waters, manufacturing process waters, or a combination thereof. Optionally tailings may be thickened with polyacrylamides. The tailings stream can also contain residual polysilicate microgels from a bitumen recovery process.

The present invention is particularly useful for treatment of tailings stream produced from mining of oil sands ores. Oil sands ores are large deposits of naturally occurring mixtures comprising bitumen, sand, clays, and other inorganic materials, such as titanium or zirconium ores. Herein, bitumen refers to hydrocarbons and other oils found in oil sands, tar sands, crude oil and other petroleum sources. The oil sands ores typically comprise about 2 to 18 wt % bitumen, based on the total weight of the oil sands ore. Oil sand ores containing greater than 6 to 7 wt % bitumen, based on the total weight of the ore, are mined commercially today. The oil sands ores further comprise water, sand and clay. Generally the oil sands ores comprise about 2 to 5 wt % water.

Oil Sands Ore

Oil sands ores are large deposits of naturally-occurring mixtures comprising bitumen, sand, clays, and other solids. Herein, bitumen refers to hydrocarbons and other oils found in oil sands, tar sands, crude oil and other petroleum sources. The oil sands ores used in the process of this invention are mined materials and typically comprise about 2 to 18 wt % bitumen, based on the total weight of the ore, for example, 6 to 7 wt % bitumen, based on the total weight of the ore or more than 7 wt % bitumen, based on the total weight of the ore. The oil sands ores further comprise water, sand and clay and other solids. Generally the oil sands ores comprise about 2 to 5 wt % water. Other solid can be naturally-occurring ores, such as titanium ores and zirconium ores that are present in the oil sands ore. The solids may include fine particles of sand, clay or other solids. Fine particles are defined within the oil sands industry as particles with a particle size of 44 micrometers or less, that is, fines have a distribution of particle sizes from sub-micron to 44 micrometers diameter. (The value of 44 microns is based on the smallest size opening for a wet sieve.) For purposes herein, particles having a particle size of less than 0.05 mm are referred to herein as "fine particles", "fine solids" or "fines".

Gelling Agents

The process of this invention uses a gelling agent. Gelling agents are compounds that facilitate gel formation of the tailings streams. Gelling agents are water soluble or capable of being dispersed in water.

Gelling agents of use in the present invention are selected from the group consisting of colloidal silica, aluminum-modified colloidal silica and microgels, de-ionized silicas and microgels, polysiloxanes, siliconates, acrylamides, acrylates, urethanes, phenoplasts, aminoplasts, vinyl esters, polyester, styrenes, furol, epoxies, vulcanized oils, lignins, lignosulfonates, lignosulfites, montan waxes, polyvinyl pyrrolidone, and combinations of two or more thereof.

In one embodiment, the gelling agent is not based on colloidal silica or silica microgel and is selected from the group consisting of polysiloxanes, siliconates, acrylamides, acrylates, urethanes, phenoplasts, aminoplasts, vinyl esters, polyester, styrenes, furol, epoxies, vulcanized oils, lignins, lignosulfonates, lignosulfites, montan waxes, polyvinyl pyrrolidone, and combinations of two or more thereof. More particularly, the gelling agent is selected from the group consisting of acrylamides, acrylates, urethanes, and combinations of two or more thereof.

In one embodiment, the gelling agent is a siliconate. The siliconate may be an alkali metal alkyl siliconate. The siliconate may be selected from the group consisting of sodium methyl siliconate, potassium methyl siliconate, and mixtures thereof.

Activator

The process of this invention uses an activator. Activators in the current invention comprise any compound or mixture of compounds that will initiate gelation. Activators useful in the present invention are compounds that initiate the reaction of the gelling agent. Examples of the suitable activators can include acids, bases, alkaline earth metal and aluminum salts, organic esters, dialdehydes, organic carbonates, organic phosphates, amides, peroxides, water, and combinations thereof.

Examples of acids useful as activators may be selected from the group consisting of sulfuric acid, carbon dioxide, phosphoric acid, sodium phosphate, sodium bicarbonate, hydrochloric acid, sodium hydrogen sulfate, oxalic acid, boric acid, citric acid, lactic acid, tartaric acid, and acetic acid. Examples of alkaline earth metal and aluminum salts may be selected from the group consisting of calcium chloride, calcium oxide, calcium carbonate, calcium sulfate, magnesium sulfate, magnesium chloride, aluminum sulfate, sodium aluminate. Examples of organic esters, aldehydes, dialdehydes, organic carbonates, organic phosphates, and amides may be selected from the group consisting of acetic esters of glycerol, glyoxal, ethylene carbonate, propylene carbonate, formaldehyde and formamide. Examples of bases may be selected from the group consisting of aniline, triethanolamine, sodium hydroxide, potassium hydroxide, lime, barium hydroxide, and ammonia. One or more activators may be used.

According to the present invention, certain activators are preferably selected to initiate gelling of a specific gelling agent. For colloidal silica and aluminum modified colloidal silica, the activator is preferably selected from the group consisting of acids and salts of multivalent cations, organic ester, dialdehyde, organic carbonate, organic phosphate, amide, and combinations of two or more thereof. For polysiloxanes and siliconates, preferred activators include acids or bases. For acrylamides, preferred activators include inorganic peroxide such ammonium persulfate. For acrylates, sulfates can be used as the preferred activator, for example, sodium thiosulfate and potassium persulfate in triethanolamine. For urethanes, water is used as the preferred activator following the reaction of diisocyanates and polydiisocyanates with alcohols. For phenoplasts, preferred activators include either acids or bases. For aminoplasts, preferred activators include acids or ammonium salts such as ammonium chloride, ammonium sulfate, and ammonium persulfate. For vinyl ester styrene and polyester styrene, peroxides are the preferred activators, for example, benzoyl peroxide or methyl ketone peroxide. For furols, polyvinylpyrrolidone, and for the reaction of calcium lignin sulfates and hexavalent chromium form lignin sulfonates, acids are the preferred activators. For epoxy resins, preferred activators include bases, such as a polyamine. For lignins, preferred activators include formaldehyde, sodium or potassium bichromate, ferric chloride, sulfuric acid, aluminum sulfate, aluminum chloride, ammonium persulfate, copper sulfate.

Examples of gelling agent—activator combinations can be found, for example, in US Army Corps of Engineers Grouting Manual EM 1110-1-3500, 31 Jan. 1995.

Accelerators

The process of this invention optionally uses an accelerator. Accelerators are useful to increase speed and decrease the time for the solids to become immobile. Accelerating agents are particularly useful for environments where temperatures are below 40° F. (4.4° C.). Examples of accelerators include multivalent metal compounds, and oxidizers such as persulfates. The multivalent metals may be calcium, magnesium, aluminum, iron, titanium, zirconium, cobalt or a combination of two or more thereof. Preferably, the multivalent metal compound is soluble in water and is used as an aqueous solution. Preferred multivalent metal compounds may be selected from the group consisting of calcium chloride, calcium sulfate, calcium hydroxide, aluminum sulfate, magnesium sulfate, and aluminum chloride, polyaluminum chloride, polyaluminum sulfate, and aluminum chlorohydrate. More preferably the multivalent metal compound is calcium sulfate, aluminum sulfate, polyaluminum sulfate, polyaluminum chloride, aluminum chlorohydrate, cobalt naphthenate or combinations thereof. Examples of persulfates include sodium persulfate, and potassium persulfate. Accelerators particularly useful for acrylamindes include nitrilo or amino propionamides, such as nitrilotrispropionamide (NTP), β-dimethylaminopropionamide (DAP), diethylaminopropionamide (REAPN), or dimethylaminopropionamide (DMAPN).

According to the present invention, the accelerator is preferably selected based on compatibility of the gelling agent used. For polyester styrene, a preferred accelerator is cobalt naphthenate.

Reinforcing Agents

The process of this invention optionally uses a reinforcing agent. Reinforcing agents are compounds that act as fillers and mechanically strengthen the treated tailings stream. Reinforcing agents can be used in an amount up to about 70 weight percent of the total weight of the trafficable deposit.

Reinforcing agents are selected from the group consisting of gravel, sand from mining operations, waste rock from mining operations; petroleum coke, coal particles; elemental crystalline sulfur; inorganic fibers; organic fibers, and combinations of two or more thereof. Inorganic fibers can be, for example, steel fibers or fiberglass. Organic fibers can be, for example, pulp waste, paper waste, wood waste, and waste paper.

In addition, the surface of the reinforcing agent may be untreated or the surface may have been treated with a surface-active agent. A typical surface-active agent is an organic silane. Surface-active agents strengthen interfacial bonds between the reinforcing agent and the treated tailings.

Trafficable Deposit

In a second embodiment a trafficable deposit is produced form the treatment process. The trafficable deposit comprises the product of the treatment process, optionally comprising adding a reinforcing agent in the contacting step (a). The trafficable deposit has a minimum undrained shear strength (yield stress) of 5 kPa one year after deposition, and a minimum undrained shear strength of 10 kPa five years after deposition.

Treatment of Tailings Stream

This invention provides a process for treating a tailings stream comprising (a) contacting (1) a gelling agent and (2) an activator with said tailings stream to produce a gel matrix comprising entrapped solids and (b) allowing the gel matrix to strengthen and solidify, e.g., by dewatering and/or drying, to produce a trafficable deposit. It is noted herein that in contrast to flocculation, in which suspended particles link together to form a precipitate, in the process of this invention, upon contact with the gelling agent and the activator, the tailings stream becomes viscous, then develops rigidity as it strengthens and solidifies.

The gelling agent is selected from the group consisting of colloidal silica, aluminum-modified colloidal silica, de-ionized colloidal silica, polysiloxane, siliconate, acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof. The tailings stream comprises water and solids, which solids comprise sand and clay, wherein 5% by volume to 100% by volume of the solids have a particle size less than 0.05 mm, based on the total volume of the solids. Preferably, the solids comprise 10% to 100% by volume of particles having a particle size of less than 0.05 mm, more preferably, 20% by volume to 100% by volume of the solids have a particle size less than 0.05 mm, based on the total volume of the solids.

The fine particles of the tailings stream separate, if at all, only very slowly from the water of the tailings stream. Surprisingly, the combination of gelling agent and activator addressees issues of treatment of tailings streams, including, for example, in a tailings pond, by producing a gelled product, which entraps solids from the tailings stream, including the fine particles.

Optionally, the process further comprises adding an accelerator in the contacting step (a). Optionally, the process further comprises adding a reinforcing agent in the contacting step (a). Optionally, the process further comprises spreading the gel produced in step (b) or the trafficable deposit produced in step (c) over a surface. Preferably, the surface is sloped or in a dewatering pit.

Optionally, the tailings stream further comprises polysilicate microgels.

The gelling agent, activator, and optional accelerator and optional reinforcing agent are provided above. Each of these is used in an effective amount to produce a gel entrapping solids, such as sand, clay, and other solids in the stream, and to provide a trafficable deposit after strengthening, dewatering and drying.

The tailings stream can be any tailings stream such as, for example, those described hereinabove. Preferably the tailings stream is produced in a bitumen extraction process. The tailings stream may be or comprise mature fine tailings.

For purposes herein, the following discussion of tailings streams will focus on mining operations for the extraction of bitumen from oil sands ores.

An oil sands ore is prepared and conditioned prior to extracting bitumen using processes which include open pit mining, crushing the ore, mixing the crushed ore with warm process water and optionally chemicals, and allowing the ore slurry to be conditioned over time with mechanical agitation. In the future, some oil sands ores may also be mined underground. Ore slurry conditioning is accomplished today by pumping the ore slurry through a hydrotransport line to a centralized extraction plant. In the future, oil sands ore conditioning and some oil separation may be conducted at the face of the mine, to reduce the amount of sand and water that need to be transported to a central processing plant. The process of this invention can be used to treat tailings from ore mined underground, as well as tailings from ore that is processed at the face of the mine.

The oil sands ore may be mixed with chemicals and water at the front end of the process (preparing and conditioning steps as recited above) and/or added at one of more of the unit operations steps to aid extraction. Sodium hydroxide is the most common chemical used today. Producers try to limit use of sodium hydroxide because, although it aids in recovering bitumen, it produces an adverse effect of stabilizing the tailings (dispersing the clay) and further increasing the time required for tailings to settle. Tailings produced when sodium hydroxide is used may be referred to as caustic tailings. Tailings produced from the process when sodium hydroxide is not used may be referred to as non-caustic tailings.

Other chemical aids may also be used to help recover bitumen. For example, alkali metal silicate, such as sodium silicate or potassium silicate, may also hinder the recovery of warm water in the thickener and the settling of fine solids in the tailings ponds. Caustic tailings, and tailings produced using other chemical aids for extraction, may present more difficulty in treatment because of their inherently greater stability. The process of this invention can be used to treat caustic tailings, non-caustic tailings, and tailings containing other chemical extraction aids.

The oil sands ore is prepared and conditioned to provide the ore in the form of an aqueous slurry. The slurry undergoes extraction in an extraction plant, which comprises several unit operations. A typical first unit operation of an extraction process involves separation of bitumen from remaining oil sands ore components in a primary separation cell (PSC), a sep cell or a primary separation vessel (PSV). Separation in a PSC produces a bitumen froth, middlings stream, and an underflow stream. The bitumen froth is fed to a froth treatment plant. The composition and consistency of the bitumen froth impacts the operation of the froth treatment plant. The middlings stream(s) is/are fed to the air flotation process. The PSC underflow is screened to remove large solids and debris and produces a tailings stream known as coarse tailings (also referred to as sand tailings). Some producers may choose to further process the coarse tailings through hydrocyclones and possibly re-direct a portion of this stream to air flotation. The process of this invention can be used to treat coarse tailings comprising solids wherein the solids comprise sand and clay and 5% by volume to 100% by volume of the solids have a particle size less than 0.05 mm. It will be appreciated by those skilled in the art that the volume percentage of fine solids to total solids in the coarse tailings produced from the PSC, based on the ores and treatment conditions, and the fact that up to about half of fines in the untreated ore may be captured in the coarse tailings stream. Many ores and treatment conditions will produce a coarse tailings stream having 5% or more, by volume of fine solids, that is solids having a particle size of less than 0.05 mm, and the volume % of such fines may at least 10% by volume, at least 20% by volume and as high as 35% by volume or 40% by volume based on the total volume of the solids.

The air flotation process is fed the middlings stream from the PSC and employs air flotation equipment and unit operations to recover additional bitumen from the middlings in the form of a froth. Air flotation devices use air bubbles to help separate the bitumen from the solids. The process outputs from the flotation unit are bitumen froth and tailings. The tailings are sometimes called fine tailings, thin fine tailings, and flotation tailings. As stated hereinabove, different entities and individuals may refer to streams by different names. The froth from the air flotation unit is typically fed back to the PSC. The tailings from air flotation contain primarily tailings with fine solids, although some coarse solids can also be present in these tails. The middlings from the PSC that are fed to the flotation unit typically comprise at least half of the fine solids from the untreated ore, plus a small fraction of the coarse solids from the untreated ore. As used herein, coarse solids refer to solids having a particle size of greater than or equal to 44 microns. The process of this invention can be used to treat coarse tails and fine tails comprising solids, which solids comprise sand and clay and have 5% by volume to 100% by volume, preferably 10% to 100% and more preferably 20% to 100% of the solids have a particle size less than 0.05 mm, based on the total volume of the solids.

Some producers choose to concentrate the flotation tailings using hydrocyclones and/or thickener vessels in order to recover more warm process water for recycle to re-use in the process and to reduce the volume of tailings sent to the tailings ponds, thus producing "thickened tailings". Air flotation tailings that are further thickened are an example of thickened tailings, which are thickened fine tailings if produced from fine tails. The process of this invention can be used to treat thickened fine tailings.

One or more stages of air flotation can be used in the process to improve the recovery of bitumen. A second stage of flotation called tailings oil recovery is common, which uses the tailings stream from the first stage of flotation as the feedstock. The tailings from the tailings oil recovery may be referred to as oil recovery tailings. The process of this invention can be used to treat oil recovery tailings.

A tailings stream known as "bird tails" is produced in some operations. Bird tails are produced from bitumen froth processing where centrifuges are used to separate oil from the solids and water in the froth. The process of this invention can be used to treat bird tails.

Some producers combine coarse tails, fine tails, and/or thickened fine tailings before depositing these streams into a tailings pond. This combined stream of tailings is sometimes called whole tailings. The process of this invention can be used to treat whole tailings.

The bitumen froth produced from the extraction plant is fed to a froth treatment plant, also known as froth treatment and solvent recovery unit. Bitumen froth contains typically approximately 50 wt % bitumen, with fine solids, water and entrapped air. Air is removed from the froth through deaeration, typically by adding steam. The deaerated froth is then mixed with a hydrocarbon solvent or diluent prior to separating the bitumen from the water and solids. The hydrocarbon solvent may be a naphthenic solvent designed to dissolve the bitumen to create a single low density hydrocarbon liquid phase. Alternatively the hydrocarbon solvent may be a paraffinic solvent designed to separate a portion of the asphaltenes in the bitumen from a lighter diluted bitumen phase. After mixing the deaerated froth and solvent, the diluted bitumen in the mixture is separated from the separation underflow. The separation process uses inclined plate separators, centrifuges, settling vessels, and/or porous media filters and employs the density difference between the diluted bitumen and the other materials as the primary means to create separation.

The diluted bitumen produced from froth treatment is typically at least 95 wt % hydrocarbon with the remainder being fine solids and water. The paraffinic froth treatment process can produce a bitumen with a purity of 99.5 wt % or higher. The separation underflow may be referred to as froth treatment tailings. Froth treatment tailings stream comprises fine solids (such as clay and sand), water, and residual diluted bitumen, and may comprise unrecovered hydrocarbon solvent. When paraffinic froth treatment is used, the froth treatment tailings stream may also contain 5 to 20 wt % asphaltenes. The process of this invention can be used to treat froth treatment tailings.

Hydrocarbon solvent in the froth treatment tailings is known to cause problems such as increased cost for make-up solvent and environmental issues. Environmental issues include increased volatile organic carbon emissions from the tailings ponds, increased airborne sulfur emissions from the tailings ponds caused by activity of sulfate-reducing bacteria in the ponds, and methane emissions from the tailings ponds caused by bacterial anaerobic digestion.

To reduce problems associated with hydrocarbon solvent in the froth treatment tailings, some companies choose to employ a solvent recovery unit operation. Froth treatment tailings are fed to a solvent recovery unit to remove solvent and produce a tailings stream. Tailings produced from the solvent recovery operation are often called tailings solvent recovery unit (TSRU) tailings or simply solvent recovery tailings. The process of this invention can be used to treat solvent recovery tailings.

Any of the caustic and non-caustic tailings, coarse tailings, coarse tails and fine tails, thickened fine tailings, oil recovery tailings, whole tailings, froth treatment tailings, solvent recovery tailings, and bird tails may be deposited in a tailings pond. Optionally, a tailings stream may be dewatered prior to depositing in a tailings pond. After tailings streams have been deposited into a tailings pond, significant settling occurs due to density differences and gravity. Coarse solids sink to the bottom of the pond. In the process of the coarse solids sinking to the bottom of the pond, such coarse solids can capture and drag suspended fine solids to the bottom, as well. This layer comprised of settled coarse solids is sometimes referred to as the beach. Process water with small concentrations of fine solids rises to the top layer and is continually skimmed off so that it can be recycled and reused in the process.

The intermediate layers in the pond contain water with differing concentrations of fine solids and residual hydrocarbons. In a typical tailings pond, the layers are generally considered, from the bottom of the pond to the top, coarse solids layer, mature fines tailings ("MFT"), immature fine tailings (a tailings with less density than MFT), process water. MFT may take months or years to form and typically contain 25 to 40 wt % fine solids suspended in water. Mature fine tailings that have existed for a decade or more are sometimes called Geriatric Fine Tailings or Legacy Tailings. Tailings streams lack sufficient to form a trafficable surface. The process of this invention can be used to treat mature fine tailings and immature fine tailings, thickened tailings, whole tailings and geriatric or legacy tailings.

Tailings management processes may include bioremediation through water capping of tailings ponds (i.e. end pit lakes); production of composite tailings and non-segregating tailings and dry stackable tailings; paste technology; centrifugation; rim ditching, among others. Non-segregating tailings are produced by contacting thickened tailings with sand and a coagulant (gypsum or carbon dioxide). Composite tailings are produced by contacting MFT with sand and a coagulant (e.g., gypsum or carbon dioxide).

As discussed hereinabove, if in producing composite or non-segregating tailings, the tailings, in fact, segregate, there is produced off-spec material or "segregated tailings". The process of this invention can be used to treat segregated tailings.

The process of this invention can be used to treat a tailings pond or a sample taken from a tailings pond. The process of this invention can be used to treat composite tailings, non-segregating tailings and dry stackable tailings.

The process of this invention can be used to treat centrifuge underflow (or centrifuge tailings) produced from centrifugation.

In particular, the gelling agent is added in an amount equal to 0.01 to 25,000 kilograms ("kg") per metric tonne ("tonne") (kg/tonne) of solids in the tailings stream. Preferably the gelling agent is added in an amount equal to 0.1 to 10 kg/tonne of solids in the tailings stream.

The activator is added in an amount equal to 0.01 to 25% by weight, based on the weight of the gelling agent. Preferably the activator is added in an amount equal to 0.01 to 10% by weight, based on the weight of the gelling agent.

When used, an accelerator is added in an amount equal to 0.01 to 10% by weight, based on the weight of the gelling agent. Preferably the activator is added in an amount equal to 0.1 to 1% by weight, based on the weight of the gelling agent.

When used, a reinforcing agent is added in an amount equal to 0.01 to 700 kg/tonne of solids in the tailings stream. Preferably the reinforcing agent is added in an amount equal to 0.01 to 100 kg/tonne of solids in the tailings stream. More preferably the reinforcing agent is added in an amount equal to 0.01 to 10 kg/tonne of solids in the tailings stream.

The contacting step (a) can be performed in various ways. The gelling agent and activator may be added directly to a tailings ponds. When added to a tailings pond, water is allowed to evaporate to dewater the tailings. The tailings stream, gelling agent and activator with optional accelerator and/or reinforcing agent may be contacted in a vessel and spread on a surface and allowed to dry. The tailings stream, gelling agent, activator and optional accelerator and/or reinforcing agent may be contacted and centrifuged to enhance separation with a reduced amount of gelling agent and activator needed. Preferably, the gelling agent, activator and optional accelerator and/or reinforcing agent are contacted with the tailings stream in a transfer line to initiate gelation, whereas gel matrix formation occurs outside the line to avoid plugging of the line. The gel matrix is spread on a surface and allowed to de-water and dry.

The process for treating a tailings stream comprising contacting a gelling agent and an activator with said tailings stream may be adjusted to vary gelation times. Adjustments include, but not limited to, varying the order of addition and/or concentration of the gelling agent, activators, accelerators, and/or reinforcing agents. Gelation time can be varied by making adjustments to pH (adding acid to lower pH, adding base to raise pH), by varying the order of addition and/or concentration of activator and/or activators relative to the gelling agent.

The concentrations of the gelling agent and activator will allow for adequate handling prior to formation into an immobile solid. This is important, for example, for applications where the tailings stream will be contacted with the gelling agent(s), activator(s), and optional accelerator(s) and/or reinforcing agents in pipes then pumped to the desired area, where the combination will be discharged onto a surface for gelling.

The gel matrix comprising the tailings stream, gelling agent and activator may be pumped or sprayed on a surface. If so, or if contacting step is performed in a transfer line, it is important to pump, spray or transfer the gel in a time before the gel solidifies to avoid forming a solid that may plug a pump, a spray nozzle or transfer line. Also, spraying the combination of tailings stream, gelling agent and activator onto a slope, before gelation is initiated is also a problem as the "ungelled" mixture may run off the slope and not set in the desired location.

The tailings stream comprises water, sand, and clay and may further comprise other solids such as silt and other minerals and optionally polysilicate microgels and/or polyacrylamides. Contacting the tailings stream with gelling agent, activator and optional accelerator and/or reinforcing agent produces a gel matrix, which entraps solid including sand and clay and other solids. The activator, accelerator, reinforcing agents, or combinations thereof, may be a) premixed with the gelling agent prior to contacting with the tailings streams, b) added simultaneously with the gelling agent while the gelling agent is contacting the tailings stream, or c) added sequentially following contacting the gelling agent with the tailings stream provided that it is prior to producing a gel matrix. For example a colloidal silica gelling agent may be premixed with an organic ester activator. Any sequence of addition may be used.

The gel matrix is then allowed to strengthen and solidify, e.g., with dewatering and/or drying to produce a trafficable deposit which is a hard solid. Upon strengthening, dewatering and/or drying, the sand, clay and other solids entrapped within the gel matrix become a hard solid that is a trafficable deposit.

Gel-entrapped solids formed from this process may be spread on a surface, preferably a sloped surface, and allowed to solidify. This step of applying the product of the contacting step to a surface may be repeated numerous times, producing a lift of several layers of solid surface that encompass the sand and clay fines of the tailings stream.

Gel-entrapped solids formed from this process may be deposited into a dewatering pit in one or more layers. When deposited in more than one layer, the weight of multiple layers produces a compression effect which then presses out water of the multiple layer deposit.

Water/solid separation may occur by air drying (evaporation), water run off, compression, syneresis, exudation, freeze/thaw, sublimation or combination thereof. By "water run off" it is meant that water is exuded from the gel-entrapped solids, or alternatively water from natural precipitation (rain, snow) that passes over the gel-entrapped solids and runs off the tailings. Water run off is generally captured in a water collection area (e.g., a pond). If water run off occurs, one may recover the water from this process and recycle the run off water. For compression, the solids can be deposited into a dewatering pit, where one or more sides allow water run off to be recovered. The water runoff or recovered water can be re-used in either bitumen extraction or in the flocculation of the tailings streams discussed infra.

The gel comprising entrapped solids including sand and clay may undergo "forced drying" using plate-and-frame filter press, or other mechanical means. Following a forced drying step the dried product may then be spread on a surface, preferably a sloped surface or deposited in a dewatering pit.

EXAMPLES

Materials and Test Methods

Materials

Mature fine tailings used in the following examples were obtained from an oil sands processor in Alberta, Canada. The solids concentrations were 25.0% to 30% on a weight basis. Unless otherwise noted, the mature fine tailings were determined to have >90 volume % particle size smaller than 0.05 mm and a peak yield stress <10 Pa. Yield stress measurements of the samples were obtained by using a Brookfield rheometer equipped with a vane spindle and results were reported in Pa (pascals). Yield stress is a measurement defined as the minimum stress needed to cause a Bingham plastic to flow. A higher yield stress indicates greater resistance to flow.

Example 1

Example 1 illustrates the use of colloidal silica for treating a tailings stream. Mature fine tailings (500 g, 25 wt % solids)

and colloidal silica (116.5 g, LUDOX® SM colloidal silica, commercially available from W.R. Grace & Co., Columbia, Md.) were added to a beaker equipped with stirring. The pH of the mixture was adjusted to 6 with sulfuric acid (2.5 N). After 2 days, the yield peak stress measured was 490 Pa and after 7 days, the yield peak stress was 2280 Pa.

Example 2

Example 2 illustrates the use of a siliconate for treating a tailings stream. Mature fine tailings (500 g, 25 wt % solids) and potassium methyl siliconate solution (13.24 g, Dow Corning 777, commercially available from Dow Corning Corp., Midland, Mich.) were added to a beaker equipped with stirring. The pH of the mixture was adjusted to 9 with sulfuric acid (2.5 N). After 72 hours, the peak yield stress was measured to be 348 Pa.

Example 3

Example 3 illustrates the in-situ polymerization of an acrylate for treating a tailings stream. Mature fine tailings (250 g) and ammonium persulfate (0.6 g in 20 mL of water) were added to a beaker equipped with stirring. Triethanolamine (0.45 g) was then added to the mixture. A gelling agent (10 mL, FLOSET Gel 400 acrylate, commercially available from SNF Floerger, Andrézieux, France) was added to the mixture. After 5 days, the peak yield stress was measured to be 122 Pa.

Example 4

Example 4 illustrates the in situ polymerization of an acrylamide for treating a tailings stream. Mature fine tailings (250 g) and ammonium persulfate (0.6 g in 20 mL of water) were added to a beaker equipped with stirring. Triethanolamine (0.45 g) was then added to the mixture. A gelling agent (10 mL, FLOSET Gel 100 acrylamide (10 mL, commercially available from SNF Floerger, Andrézieux, France) was added to the mixture. After 5 days, the peak yield stress was measured to be 358 Pa.

Example 5

Example 5 illustrates the use of aluminum modified colloidal silica for treating a tailings stream. Mature fine tailings (500 g) and aluminum surface modified colloidal silica (175 grams, LUDOX® AM colloidal silica, commercially available from W.R. Grace & Co., Columbia, Md.) were added to a beaker equipped with stirring followed by sodium sulfate (18.4 g). The pH of the mixture was adjusted to 6 with sulfuric acid (2.5 N). After 5 days, the yield peak stress measured was 691.

Example 6

Example 6 illustrates the use of cationically charged colloidal silica for treating a tailings stream. Mature fine tailings (500 g, 30 wt % solids) and a colloidal silica suspension (58.3 g, 30 wt % in water, LUDOX® CL colloidal silica, commercially available from Sigma-Aldrich Corporation, St. Louis, Mo.) were added to a beaker equipped with stirring. The pH was adjusted to 5 with sulfuric acid (2.5 N). After 30 minutes, the peak yield stress was measured to be 55 Pa.

Example 7

Example 7 illustrates contacting the gelling agent and activator together prior to treating an oil sands tailings stream.

The mature fine tailings used in this example were determined to have greater than 15 volume % particles size smaller than 0.05 micron. Triethanolamine (0.45 g) was added to ammonium persulfate (0.6 g dissolved in 20 mL of deionized water). A gelling agent (10 mL, FLOSET Gel 100 acrylamide, commercially available from SNF Floerger, Andrézieux, France) was added to the mixture and mixed for 2 seconds followed by addition of mature fine tailings (250 g). The mixture was then stirred for 75 seconds. After 5 days, the peak yield stress was measured to be 583 Pa. After 8 days, the yield peak stress increased to 890 Pa.

Example 8

Example 8 illustrates the effect of incorporating a reinforcing agent when treating a tailings stream. A paper pulp slurry was prepared by adding bleached kraft softwood pulp (2.5 g) was added to water (19.8 g). The paper pulp slurry (19.8 g) was added to mature fine tailings (500 g, 30.4 wt % solids). Colloidal silica (100.0 g, LUDOX® SM colloidal silica commercially available from Sigma-Aldrich Corporation, St. Louis, Mo.) was added to mixture. The pH was adjusted to 6.0 with sulfuric acid (2.5 N). Yield stress was measured at 1, 2, 3, and 7 days. Results are listed in Table 2.

Comparative Example A

Comparative Example A illustrates treating a tailings stream without the use of a reinforcing agent. Water (19.8 g) was added to mature fine tailings (500.0 g). Colloidal silica (100.0 g, LUDOX® SM colloidal silica) was then added to the mixture. The pH was adjusted to 6.0 with sulfuric acid (2.5 N). Yield stress was measured at 1, 2, 3, and 7 days. Results are listed in Table 2.

TABLE 2

Yield Stress measurements with and without a reinforcing agent.

| | Yield Stress Pa | | | |
| Example | 1 day | 2 days | 3 days | 7 days |
| --- | --- | --- | --- | --- |
| 8 | 30 | 103 | 397 | 1472 |
| Comparative A | 21 | 73 | 248 | 1084 |

As can be seen from Table 2, addition of a reinforcing agent increases yield stress.

Example 9

Example 9 is a repeat of Example 8 at a higher pulp loading when treating a tailings stream. The mature fine tailings used in this example were determined to have greater than 90 volume % particle size smaller than 0.05 mm, based on the total volume of the solids. A paper pulp slurry was prepared by adding bleached kraft softwood pulp (5 g) was added to water (34.7 g). The paper pulp slurry (39.7 g) was added to mature fine tailings (500 g, 30.4 wt % solids). Colloidal silica (100.0 g, LUDOX® SM colloidal silica commercially available from Sigma-Aldrich Corporation, St. Louis, Mo.) was added to mixture. The pH was adjusted to 6.0 with sulfuric acid (2.5 N). Yield stress was measured at 1, 4, and 7 days. Results are listed in Table 3.

Comparative Example B

Comparative Example B illustrates treating a tailings stream without the use of a reinforcing agent. Water (37.7 g)

was added to mature fine tailings (500.0 g). Colloidal silica (100.0 g, LUDOX® SM colloidal silica) was then added to the mixture. The pH was adjusted to 6.0 with sulfuric acid (2.5 N). Yield stress was measured at 1, 4, and 7 days. Results are listed in Table 3.

TABLE 3

Yield stress measurements with and without a reinforcing agent at a higher pulp loading.

| Example | Yield Stress (Pa) | | |
|---|---|---|---|
| | 1 day | 4 days | 7 days |
| 9 | 52 | 988 | 2032 |
| Comparative B | 19 | 416 | 928 |

As can be seen from Table 3, addition of a reinforcing agent increases yield stress.

Example 10

This example demonstrates the use of a gelling agent to strengthen a composite tailings mixture. Mature fines tailings, 83 g, were mixed with 167 g of tailings sand. The MFT+sand mixture was determined to have >35 volume % particle size smaller than 0.05 mm, based on the total volume of the solids. Ammonium persulfate, 0.6 g was dissolved in 20 ml of deionized water. The ammonium persulfate solution was then mixed with the MFT/sand mixture for 5 minutes. Triethanolamine, 0.45 g was then added and mixed for 1 minute. 10 ml of FLOSET Gel 400 acrylate, 10 ml, was added and mixed for 5 minutes. The yield stress was measured after 7 days and found to be 692 Pa.

What is claimed is:

1. A process for treating a tailings stream comprising (a) contacting (1) a gelling agent and (2) an activator with said tailings stream, wherein the tailings stream comprises water and solids, which solids comprise sand and clay, and wherein 5% by volume to 100% by volume of the solids have a particle size less than 0.05 mm, based on the total volume of the solids; (b) entrapping the solids within a gel; and (c) allowing the gel to strengthen and solidify to produce a trafficable deposit; wherein the gelling agent is selected from the group consisting of acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof.

2. A process according to claim 1 further comprising adding an accelerator in the contacting step (a).

3. A process according to claim 1 further comprising adding a reinforcing agent in the contacting step (a).

4. A process according to claim 3 further comprising spreading the gel produced in step (a) or the trafficable deposit produced in step (c) over a surface.

5. A process according to claim 4 wherein the surface is a sloped surface.

6. A process according to claim 1 further comprising depositing the gel produced in step (a) or the trafficable deposit produced in step (c) in a dewatering pit.

7. A process according to claim 1 wherein the tailings stream is produced in a process to extract bitumen from oil sands ores.

8. A process according to claim 1 wherein step (c) comprises a dewatering step.

9. A process according to claim 8 wherein dewatering occurs by air drying (evaporation), water run off, compression, syneresis, exudation, freeze/thaw, sublimation or combination thereof.

10. A process according to claim 9 wherein dewatering occurs by evaporation.

11. A process according to claim 9 wherein drying occurs by water run off.

12. A process according to claim 10 wherein the water run off is recovered and recycled.

13. A process according to claim 1 wherein the gelling agent is selected from the group consisting of acrylamides, acrylates, urethanes, and combinations of two or more thereof.

14. A process according to claim 1 wherein the gelling agent is an acrylamide and the activator is an inorganic peroxide.

15. A process according to claim 1 wherein the gelling agent is an acrylate and the activator is sodium thiosulfate or potassium persulfate in triethanolamine.

16. A process according to claim 2 wherein the accelerator is a multivalent metal compound or an oxidizer.

17. A process according to claim 16 wherein the accelerator is selected from the group consisting of calcium chloride, calcium sulfate, calcium hydroxide, aluminum sulfate, magnesium sulfate, and aluminum chloride, polyaluminum chloride, polyaluminum sulfate, and aluminum chlorohydrate.

18. A process according to claim 16 wherein the accelerator is sodium persulfate or potassium persulfate.

19. A process according to claim 2 wherein the accelerator is nitrilotrispropionamide (NTP), β-dimethylaminopropionamide (DAP), diethylaminopropionamide (REAPN), or dimethylaminopropionamide (DMAPN).

20. A process according to claim 3 wherein the reinforcing agent is selected from the group consisting of gravel, sand from mining operations, waste rock from mining operations; petroleum coke, coal particles; elemental crystalline sulfur; inorganic fibers; organic fibers, and combinations of two or more thereof.

21. A process according to claim 20 wherein the reinforcing agent is treated with a surface-active agent.

22. A process according to claim 20 wherein the reinforcing agent is organic fibers.

23. A process according to claim 1 wherein the gelling agent is added in an amount equal to 0.01 to 25,000 kg/tonne of solids in the tailings stream and the activator is added in an amount equal to 0.01 to 25% by weight, based on the weight of the gelling agent.

24. A process according to claim 23 wherein the gelling agent is added in an amount equal to 0.1 to 10 kg/tonne of solids in the tailings stream and the activator is added in an amount equal to 0.01 to 10% by weight, based on the weight of the gelling agent.

25. A process according to claim 2 further comprising adding a reinforcing agent in the contacting step (a), wherein the accelerator is added in an amount equal to 0.01 to 10% by weight, based on the weight of the gelling agent and the reinforcing agent is added in an amount equal to 0.01 to 700 kg/tonne of solids in the tailings stream.

26. A process according to claim 1 wherein the tailings stream further comprises polysilicate microgels, polyacrylamides, or combinations thereof.

* * * * *